United States Patent [19]

Graves et al.

[11] Patent Number: 5,091,471
[45] Date of Patent: Feb. 25, 1992

[54] ELASTOMER BLENDS HAVING IMPROVED EXTRUSION RESISTANCE AND METHOD FOR THE PREPARATION THEREOF

[75] Inventors: Daniel F. Graves, Clinton; William L. Hergenrother, Akron, both of Ohio

[73] Assignee: Bridgestone/Firestone, Inc., Akron, Ohio

[21] Appl. No.: 297,166

[22] Filed: Jan. 17, 1989

[51] Int. Cl.$^5$ ............................................. C08L 53/00
[52] U.S. Cl. ......................................... 525/90; 525/89; 525/91; 525/98; 525/99
[58] Field of Search ............... 525/90, 69, 89, 91, 525/98, 99; 528/69

[56] References Cited

U.S. PATENT DOCUMENTS

| | | | |
|---|---|---|---|
| 3,652,710 | 3/1972 | Wright | 29/12 |
| 3,838,108 | 9/1974 | Hergenrother et al. | 260/77.5 CR |
| 4,070,344 | 1/1978 | Hergenrother et al. | 260/77.5 CR |
| 4,298,707 | 11/1981 | Hergenrother et al. | 525/374 |
| 4,500,466 | 2/1985 | Hayes et al. | 260/429.9 |
| 4,668,756 | 5/1987 | Cassidy et al. | 528/69 |
| 4,708,987 | 11/1987 | Hergenrother et al. | 525/130 |
| 4,720,526 | 1/1988 | Roland | 525/273 |

FOREIGN PATENT DOCUMENTS 0178752 6/1985 European Pat. Off.
0285929 3/1988 European Pat. Off.

OTHER PUBLICATIONS

Abstract of Japanese Patent 56-132192, Shimozato, 3/83.

*Primary Examiner*—Kriellion S. Morgan
*Assistant Examiner*—Edward J. Cain
*Attorney, Agent, or Firm*—Daniel N. Hall

[57] ABSTRACT

Curable elastomer compositions having improved extrusion resistance comprise from about 50 to 90 parts by weight of a homogeneous blend of rubber, selected from the group consisting of natural and synthetic rubbers and blends thereof, and from about 10 to 50 parts by weight of a block copolymer containing elastomeric blocks and crystalline blocks. The elastomer compositions of the present invention have particular utility as oil well packers. A method for improving the extrusion resistance of curable elastomer compositions comprises the steps of blending together an elastomer, selected from the group consisting of natural and synthetic rubbers and blends thereof with a block copolymer containing elastomeric blocks and crystalline blocks to form a mixture and then curing the mixture.

15 Claims, No Drawings

ELASTOMER BLENDS HAVING IMPROVED EXTRUSION RESISTANCE AND METHOD FOR THE PREPARATION THEREOF

TECHNICAL FIELD

This invention relates to compounds formed by blending elastomers to provide high modulus, oil resistance, heat stability and extrusion resistance. Such compounds would have utility in oil-well packers as well as other environments, or products such as draft gear pads, where exposure to high temperatures and high mechanical stresses prevail. A method for improving the extrusion resistance of certain elastomers is also provided.

BACKGROUND ART

Blending of elastomers with other elastomers as well as non-elastomers to achieve a particular result is well known. Nevertheless, there still exist many applications where new compositions are required to obtain better performance from an existing elastomer.

One recent discovery which provides improved mechanical properties is described in a published European Patent Application, No. 178,752. The invention disclosed therein involves the modification of various rubbers by the addition of low molecular weight liquid telechelic polymers to produce a highly extensible product which is as good as or better than the unmodified rubber in terms of abrasion resistance and hot mechanical properties.

The rubbers modified include natural rubber and a variety of the common synthetic rubbers. The telechelic polymers added contain various functionalities including carboxyl, amine, hydroxy, epoxy and modifications thereof. In order to blend the two together a linking agent is employed including reactive metal compounds, organo-metallic compounds and multi-functional epoxides.

The present invention does not rely on the addition of telechelic polymers, nor does it require a linking agent. The material blended with the elastomer is a block copolymer described in U.S. Pat. No. 3,838,108. This patent, owned by the Assignee of record, described block copolymers comprising anionically polymerized olefins and other monomers and crystalline blocks from a variety of monomers including nylon forming, urea forming, urethane forming, imide forming and the like.

Despite the fact that these block copolymers were described over 12 years ago, there has been no recognition until now that they could be blended with certain elastomers to provide improved mechanical properties.

DISCLOSURE OF THE INVENTION

The curable elastomer compositions of the present invention have improved extrusion resistance and comprise a homogeneous blend of from about 50 to about 90 parts by weight of a rubber selected from the group consisting of natural and synthetic rubbers and blends thereof and from about 10 to about 50 parts by weight of a block copolymer containing elastomeric blocks and crystalline blocks to form 100 total parts of elastomer.

The invention also provides a method for improving the extrusion resistance of curable elastomer compositions comprising a first step of blending together from about 50 to about 90 parts by weight of a rubber, selected from the group consisting of natural and synthetic rubbers and blends thereof with from about 10 to about 50 parts by weight of a block copolymer containing elastomeric blocks and crystalline blocks to form a mixture. The mixture is then cured under conventional conditions for the rubber.

PREFERRED MODE FOR CARRYING OUT THE INVENTION

As noted hereinabove the present invention provides an elastomeric composition containing a blend of a rubber with a curable block copolymer. The rubber or elastomer has a high molecular weight, on the order of about 50,000 to 500,000 weight average molecular weight.

Suitable elastomers include natural rubber, synthetic polyisoprene rubber, styrene butadiene rubber (SBR), polybutadiene, butyl rubber, Neoprene, ethylene/propylene rubber, ethylene/propylene/diene rubber (EPDM), acrylonitrile butadiene rubber, silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. Particularly suitable rubbers include acrylonitrile/butadiene rubber, EPDM and SBR.

The curable block copolymers comprise an anionically polymerizable rubber-forming monomer and a thermosetting plastic providing a semi-crystalline or crystalline block. Preferred members of this group are the block copolymers 1,4- and 1,2-polybutadiene, having a weight average molecular weight of about 3000 to 100,000 and polycaprolactam. They form a low molecular weight, nylon block copolymer commercially available as MARAN resin from the Firestone Tire and Rubber Company. Nylon content can range from about 20 percent to about 80 percent by weight of the composition.

The preparation of these block copolymers are described at length in the aforementioned U.S. Pat. No. 3,838,108, the subject matter of which is incorporated herein by reference. That process includes the anionic polymerization of an olefin, or other monomer, which is end-capped with an isocyanate or isothiocyanate and then reacted with a lactam or other monomer. A subsequent patent, U.S. Pat. No. 4,070,344, also owned by the Assignee of record herein, teaches an improved process which calls for the reaction of the end capped polymer with an amide followed by hydrolyzation to produce a primary amine terminated polymer. This polymer is highly stable and can be subsequently reacted with lactams or other monomers in the presence of an isocyanate to provide the block copolymer.

In addition to polybutadiene, other monomers that can be polymerized to form the base polymer of the block include a wide variety of materials such as dienes and vinyl substituted aromatics, e.g., 1,3-butadiene and styrene, respectively. Generally, any monomer capable of undergoing anionic polymerization can be used. Some of these monomers can be generally classified as olefins since they contain at least one olefinic group and may be represented by the following structural formulae, wherein R is hydrogen, alkyl, cycloalkyl, an aromatic ring or a substituted aromatic ring:

1) $CH_2=CACN$ wherein A is $C_n$, $CF_3$, $CH_3$ or H
2) $CH_2=CACO_2R$ wherein A is $CO_2R$, $SO_2R$, $CH_3$ or H
3) $CH_2=CANO_2$ wherein A is Cl, $CH_3$ or H
4) $CH_2=CACON(R)_2$ wherein A is $CH_3$ or H.

Other monomers which can be anionically polymerized are represented by the following structural formulae:

5)

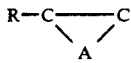

where A is O or S and R is H or an aliphatic, cycloaliphatic or aromatic group containing from 1 to 15 carbon atoms, inclusive.

6) RCH=A where A is O or S and R is an aliphatic, cycloaliphatic or aromatic group containing from 1 to 15 carbon atoms, inclusive.

7)

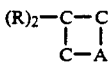

where A is O or S and R is an aliphatic, cycloaliphatic or aromatic group containing from 1 to 15 carbon atoms, inclusive.

8) $(R)_2C=S$ where R is an aliphatic, cycloaliphatic or aromatic group containing from 1 to 15 carbon atoms, inclusive.

The monomers as represented by formulae 5, 6, 7 and 8 are preferred in the subject invention. Examples of such monomers include ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isobutyrthioaldehyde, n-caprothioaldehyde, 3-dimethyloxycyclobutane, 3-diethyloxycyclobutane, 3-methylethyloxycyclobutane, 3-dimethylthiocyclobutane, 3-diethylthiocyclobutane, 3-methylethylthiocyclobutane, methyl ethyl thioketone, methyl isopropyl thioketone and diethyl thioketone. Suitable monomers represented by formula No. 8 do not include large groups such as two phenyls since such monomers are difficult to polymerize due most probably to stearic hindrance.

Other monomers which may generally be used to prepare the base polymers are the conjugated dienes and the vinyl substituted aromatic compounds. The conjugated dienes ordinarily contain from 4 to 12 carbon atoms and preferably from 4 to 8 carbon atoms. Examples of such dienes include 1,3-butadiene; isoprene, 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene and the like. The vinyl substituted aromatic compounds include styrene, 1-vinylnaphthalene, 2-vinylnaphthalene, and the alkyl, cycloalkyl, aryl, alkaryl and arakyl derivatives thereof in which the total number of carbon atoms in the combined substituents is generally not greater than 12. Examples of such compounds include 3-methylstyrene; alpha-methylstyrene; 4-n-propylstyrene; 4-t-butylstyrene; 4-dodecylstyrene, 4-cyclohexylstyrene; 2-ethyl-4-benzylstyrene; 4-methoxystyrene; 4-dimethylaminostyrene; 3,5-diphenoxystyrene; 4-p-tolystyrene; 4-phenylstyrene; 4,5-dimethyl-1-vinylnaphthalene; 3-n-propyl-2-vinylnaphthalene and the like.

The conjugated dienes and the vinyl substituted aromatic compounds as well as many of the other monomers noted herein generally can be polymerized alone or in admixture to form homopolymers, copolymers or block copolymers which serve as the base polymer. The dienes which are preferred are 1,3-butadiene and isoprene, and preferred vinyl substituted aromatic monomers are styrene, alpha-methylstyrene and 4-t-butylstyrene. A preferred based copolymer is styrene-butadiene.

Yet another group of monomers which can be employed are the heterocyclic nitrogen containing monomers such as pyridine and quinoline derivatives containing at least 1 vinyl or alphamethylvinyl group such as 2-vinylpyridine, 3-vinylpyridine, 4-vinylpyridine, 3-ethyl-5-vinylpyridine, 3-methyl-5-vinylpyridine, 3,5-diethyl-4-vinylpyridine and similar mono- and di-substituted alkenyl pyridines and like quinolines such as 2-vinylquinoline, 3-vinylquinoline, 4-vinylquinoline and so forth. In general the various vinyl substituted pyridines and vinyl substituted quinolines are also preferred monomers.

In order to conclude the polymerization with the addition of the second block, any of the foregoing isocyanate-reactive monomers or monomer groups disclosed in U.S. Pat. No. 3,838,108 can be employed in lieu of the lactams such as the ureas, urethanes, urethane-ureas, imides, thioureas, thiourethanes and the like. These have in common the fact that each contains an active hydrogen which is reactive toward the isocyanate terminated base polymers as was amply illustrated in Pat. No. 3,838,108. Generally speaking, the second block forming monomer can be described as one having an active hydrogen but which monomer is not one utilized to form a polymer present in the base polymer.

The elastomeric composition of the present invention comprises from about 50 to about 90 parts by weight of the first, or unmodified, elastomer and from about 10 to about 50 parts by weight of the block copolymer to provide 100 total parts. Other components conventionally compounded with the unmodified elastomer including fillers, reinforcing agents, curatives, accelerators, antioxidants, processing aids and the like can be added as used. Inasmuch as the presence of these components does not effect the properties obtained by the addition of the block copolymer, the present invention should not be limited to any specific additive component or amount thereof.

Additionally, a metal dimethacrylate can be added which has shown a positive effect on the desired properties of the elastomer composition. Preferred compounds are zinc dimethacrylate and magnesium dimethacrylate. Preparation of these compounds are described in U.S. Pat. No. 4,500,466 while the addition to curable rubber compositions, for the purpose of increasing the modulus, is described in U.S. Pat. No. 4,720,526, the subject matter of which is incorporated herein by reference. The amount of metal methacrylate that can be employed ranges from about 0 to about 50 parts, per 100 parts of rubber (phr) and it is added during compounding, prior to curing. As the amount of metal dimethacrylate is increased, for instance, beyond 20 phr, it may be desirable to decrease the amount of fillers, particularly carbon black.

The method of the present invention includes the steps of blending together from about 50 to about 90 parts by weight of the unmodified elastomer with from about 10 to about 50 parts by weight of the block copolymer to form a mixture and then curing the mixture at 140° to 175° C. for 0.1 to 8 hours. Blending is conducted in any standard mixing apparatus such as Brabender, Banbury, double arm mixer and the like and usually requires from about 3 to 10 minutes. Although such blending or mixing is necessary, just as it is required for any rubber composition, the present invention is not specifically limited to a given apparatus or mixing time. Addition of a metal dimethacrylate with the block copolymer is conducted in a customary manner for the addition of powdered ingredients during rubber compounding.

In order to demonstrate practice of the present invention and the resulting improved properties, 31 elastomeric compositions were prepared, cured and tested. The first four formulations are presented in Table I where all parts are listed in phr with one exception. For Example No. 4, 10 parts of acrylonitrile/butadiene rubber were replaced with an equivalent weight of the Maran resin additive in order to employ the same levels of additives and curatives as in Example No. 3. Thus, for Example No. 4, the rubber content was made up from two components, acrylonitrile/butadiene rubber and Maran resin. Adjusting to 100 parts of acrylonitrile/butadiene rubber in Example No. 4, the Maran resin content can be expressed as 11.1 phr with is the manner in which it appears in Table II, hereinbelow.

In the remaining Examples, 5-31, the amount of Maran resin employed ranged between 10 and 50 parts by weight with 50 to 90 parts of the unmodified elastomer to provide 100 total parts, that is, Maran addition was not made on a phr basis but rather as a component of the elastomer content. While the block copolymer content can be expressed as phr or parts by weight of the elastomer, the latter mode is preferred. All other components and in particular, the metal dimethacrylate, have been listed in phr.

TABLE I

| EPDM Rubber Stock | | |
|---|---|---|
| Components | Ex. No. 1 | Ex. No. 2 |
| EPDM | 100 | 100 |
| Hypalon 40$^a$ | 5 | 5 |
| Irganox 1076$^b$ | .5 | .5 |
| Carbon Black | 150 | 150 |
| Maran resin$^c$ | — | 10 |
| Zinc dimethacrylate | 20 | 20 |
| Ricon 153$^d$ | 20 | — |
| Sb$_2$O$_3$ | 5 | 5 |
| Zn Stearate | 7 | 7 |
| HVA-2$^e$ | 2.0 | 2.0 |
| Di-cup 40C$^f$ | 4.0 | 4.0 |
| Total | 313.5 | 303.5 |

| Acrylonitrile/Butadiene Rubber Stock | | |
|---|---|---|
| Components | Ex. No. 3 | Ex. No. 4 |
| Krynac 825$^g$ | 100 | 90 |
| Zinc dimethacrylate | 30 | 30 |
| Maran resin$^c$ | — | 10 |
| Zinc Stearate | 5 | 5 |
| Polygard$^h$ | 1.5 | 1.5 |
| Carbon Black | 50 | 50 |
| Vulcup 40 KE$^i$ | 3.5 | 3.5 |
| Altax$^j$ | 2.0 | 2.0 |
| Total | 192 | 192 |

$^a$Chlorosulfonated EPDM
$^b$Registered trademark of Ciba-Geigy Corp. for high molecular weight antioxidant
$^c$Described in the specification
$^d$Liquid 1,2-polybutadiene
$^e$DuPont, bis meta-phenylene dimaleimide
$^f$Registered trademark of Hercules, Inc. for dicumyl peroxide vulcanizing agents
$^g$Acrylonitrile/butadiene rubber
$^h$Registered trademark of Uniroyal Chemical for mixtures of alkylated aryl phosphites
$^i$Vulcanizing agent, Hercules, 40% alpha,alpha' bis(t-butylperoxy)diisopropyl benzene on Burgess 40 KE clay
$^j$Registered trademark of Goodyear Tire and Rubber Co. for benzothiazyl disulfide For Examples No. 1 and 2, EPDM rubber was selected as the unmodified elastomer; for Examples No. 3 and 4, acrylonitrile/butadiene rubber (NBR) was selected. Example No. 1, a control, contained 20 phr of a liquid 1,2-polybutadiene available as Ricon 153 from Colorado Chemical. This stock has known utility in achieving high crosslink density and, in turn, high modulus in some packer compositions. For comparison, Example No. 2 contained 10 phr of Maran resin (polybutadiene/nylon block copolymer). For Example No. 3, NBR was employed as a control with no block copolymer while Example No. 4 contained 11.1 phr (10%) of Maran resin.

The compositions were prepared by adding all the materials except the curatives in an internal mixer such as "B" Banbury and mixing at 80 rpm for about 5 to 6 minutes. Batches were dropped at a final temperature of about 170° C. Curatives were then added on an open mill following which samples were then sheeted and cured for 30 minutes at 160° C. Mooney viscosity was determined and reported with stress-strain properties in Table II. Also determined and reported were Shore "A" hardness; Ring tear and MAOET (Modified Annular Orifice Extrusion Test) Visual Ratings. The MAOET is a specific test to determine extrusion resistance and employs a modified piston which has a rounded bottom and also, a larger annular space is provided between the inner wall of the test jig and the piston. It is conducted by placing a load of 69 MPa on an ASTM compression set button pallet for 30 minutes at 149° C. A visual rating system is employed to evaluate the tested sample where 1 is good and 10 is poor. A complete description of the test and the rating system is described in "Test for Evaluating Extrusion Resistance for Oil Well Packer Applications" *Rubber Chemistry and Technology*, Vol. 53, pp. 1239-1260 (1980), the subject matter of which is incorporated herein by reference.

TABLE II

| Physical Properties of Table I Rubber Stocks | | | | |
|---|---|---|---|---|
| | Ex. No. 1 | Ex. No. 2 | Ex. No. 3 | Ex. No. 4 |
| EPDM | 100 | 100 | — | — |
| NBR | — | — | 100 | 90 |
| Ricon 153 | 20 | — | — | — |
| Maran | — | 10 | — | 11.1 |
| Zinc dimethacrylate | 20 | 20 | — | 10 |
| Properties | | | | |
| ML/4 100° C. | 43 | 99 | 55 | 54 |
| Stress Strain$^a$ | | | | |
| 20% Modulus (MPa) | 5.1 | 3.1 | 7.2$^c$ | 9.9$^c$ |
| 100% Modulus (Mpa) | — | 8.2 | 14.0 | 16.0 |
| Tensile (MPa) | 8.6 | 10.8 | 19.8 | 18.7 |
| % Elongation | 80 | 210 | 165 | 150 |
| Shore "A" Hardness 23° C. | 94 | 89 | 90 | 90 |
| Compression Set 70 hrs, 100° C. | 33.6 | 30.4 | 37.6 | 34.4 |
| Ring Tear 23° C. (MPa) | 1.5 | 2.1 | — | — |
| MAOET Visual Rating$^b$ | 10+ | 3 | 2 | 1 |

$^a$Cured 30 minutes at 160° C.
$^b$69 MPa/30 min/149° C.
$^c$50% Modulus

As can be determined from the results reported in Table II, the extrusion resistance for an EPDM composition was significantly improved by the substitution of a block copolymer (Ex. No. 2) for the liquid 1,2-polybutadiene (Ex. No. 1). Also, although the NBR control (Ex. No. 3) had an even better extrusion resistance then the EPDM/block copolymer blend, when it was blended with a block copolymer according to the present invention (Ex. No. 4), extrusion resistance was again improved. The other physical properties were either about comparable to the elastomers that were unblended with the block copolymer or they were improved.

In Table III, four additional elastomeric compositions based on EPDM rubber have been reported to provide a comparison between EPDM alone as a Control (Ex. No. 5) and EPDM with Maran resin and zinc dimethacrylate. For Examples No. 5 and 6, EPDM rubber was compounded without and with Maran resin to show the effect of Maran alone. For Examples No. 7 and 8, EPDM rubber was compounded with 20 phr of zinc dimethacrylate, each without and with Maran resin. Thus, one can compare EPDM containing no additive; one or the other additives alone and both additives.

TABLE III

| EPDM Rubber Stocks, Peroxide Cured | | | | |
|---|---|---|---|---|
| Components | Ex. No. 5 | Ex. No. 6 | Ex. No. 7 | Ex. No. 8 |
| EPDM | 100 | 100 | 100 | 100 |
| Irganox 1076[a] | .5 | .5 | .5 | .5 |
| Carbon Black | 150 | 150 | 150 | 150 |
| Maran resin[b] | — | 10 | — | 10 |
| Zinc dimethacrylate | — | — | 20 | 20 |
| Zn Stearate | 7 | 7 | 7 | 7 |
| HVA-2[c] | 2 | 2 | 2 | 2 |
| Vulcup 40 KE[d] | 4 | 4 | 4 | 4 |
| Total | 263.5 | 273.5 | 283.5 | 293.5 |

[a]Registered trademark of Ciba-Geigy Corp. for high molecular weight antioxidant
[b]Described in the specification
[c]DuPont, bis meta-phenylene dimaleimide
[d]Vulcanizing agent, Hercules, 40% alpha,alpha' bis(t-butylperoxy)diisopropyl benzene on Burgess 40 KE clay The compositions were prepared and cured as described for Examples No. 1–4. Physical properties, including MAOET extrusion resistance were determined and have been reported in Table IV.

TABLE IV

| Physical Properties of Table III EPDM Rubber Stocks | | | | |
|---|---|---|---|---|
| | Ex. No. 5 | Ex. No. 6 | Ex. No. 7 | Ex. No. 8 |
| EPDM | 100 | 100 | 100 | 100 |
| Maran | 0 | 10 | 0 | 10 |
| Zn dimethacrylate | 0 | 0 | 20 | 20 |
| Properties | | | | |
| ML/4 100° C. | 147.9 | 135.6 | 132.1 | 118.2 |
| Stress Strain[a] | | | | |
| 20% Modulus (MPa) | 2.4 | 2.9 | 2.9 | 3.5 |
| 50% Modulus (MPa) | 4.4 | 4.9 | 5.0 | 5.6 |
| Shore "A" Hardness 23° C. | 87 | 88 | 89 | 92 |
| Compression Set 70 hrs, 100° C. | 17.6 | 23.6 | 27.6 | 27.9 |
| MAOET Visual Rating[b] | 9 | 7 | 5 | 6 |

[a]Cured 30 minutes at 160° C.
[b]69 MPa/30 min/149° C.

As can be determined for the results reported in Table IV, the extrusion resistance for an EPDM composition was significantly improved by the addition of either the Maran resin (Ex. No. 6) or zinc dimethacrylate (Ex. No. 7) or both (Ex. No. 8). The other physical properties were also improved by the presence of either or both additives.

In Table V, five additional elastomeric compositions based on EPDM rubber have been reported. Example 9 was a control, containing no Maran resin or zinc dimethacrylate; Examples 10 and 11 both contained different amounts of Maran resin without zinc dimethacrylate and Examples 12 and 13 each contained zinc dimethacrylate, without and with Maran resin.

TABLE V

| EPDM Rubber Stocks, Peroxide Cured | | | | | |
|---|---|---|---|---|---|
| Components | Ex. No. 9 | Ex. No. 10 | Ex. No. 11 | Ex. No. 12 | Ex. No. 13 |
| EPDM | 100 | 100 | 100 | 100 | 100 |
| Irganox 1076[a] | .5 | .5 | .5 | .5 | .5 |
| Carbon Black | 150 | 150 | 150 | 150 | 150 |
| Maran resin[b] | — | 10 | 20 | — | 10 |
| Zinc dimethacrylate | — | — | — | 20 | 20 |
| Zn Stearate | 5 | 5 | 5 | 5 | 5 |
| HVA-2[c] | 2 | 2 | 2 | 2 | 2 |
| Vulcup 40 KE[d] | 4.5 | 4.5 | 4.5 | 4.5 | 4.5 |
| Total | 262 | 272 | 282 | 282 | 292 |

[a]Registered trademark of Ciba-Geigy Corp. for high molecular weight antioxidant
[b]Described in the specification
[c]DuPont, bis meta-phenylene dimaleimide
[d]Vulcanizing agent, Hercules, 40% alpha,alpha' bis(t-butylperoxy)diisopropyl benzene on Burgess 40 KE clay The compositions were prepared as described for Examples No. 1–4. Physical properties, including MAOET extrusion resistance were determined and have been reported in Table VI.

TABLE VI

| Physical Properties of Table V Rubber Stocks | | | | | |
|---|---|---|---|---|---|
| | Ex. No. 9 | Ex. No. 10 | Ex. No. 11 | Ex. No. 12 | Ex. No. 13 |
| EPDM | 100 | 100 | 100 | 100 | 100 |
| Maran | 0 | 10 | 20 | 0 | 10 |
| Zn dimethacrylate | 0 | 0 | 0 | 20 | 20 |
| Properties | | | | | |
| ML/4 100° C. | 136.6 | 119.8 | 107.7 | 118.3 | 110.7 |
| Stress Strain[a] | | | | | |
| 50% Modulus (MPa) | 3.9 | 5.7 | 6.4 | 6.8 | 8.0 |
| 100% Modulus (MPa) | 8.8 | 10.1 | — | 11.5 | — |
| Tensile (MPa) | 9.6 | 10.0 | 9.6 | 12.3 | 11.8 |
| % Elongation | 115 | 102 | 94 | 112 | 85 |
| Shore "A" Hardness 23° C. | 85 | 90 | 92.5 | 90 | 94 |
| Compression Set 70 hrs, 100° C. | 8.8 | 11 | 13.5 | 21.6 | 17.5 |
| MAOET Visual Rating[b] | 10 | 8 | 9 | 8 | 4+ |

[a]Cured 40 minutes at 160° C.
[b]69 MPa/30 min/149° C.

As can be determined from the results reported in Table VI, the extrusion resistance for an EPDM composition was again significantly improved by the addition of either the Maran resin (Ex. Nos. 10, 11) or zinc dimethacrylate (Ex. No. 12) or both (Ex. No. 13). The other physical properties were also improved by the presence of either or both additives.

In Table VII, five more EPDM rubber compositions have been reported, none of which contained any zinc methacrylate, so as to demonstrate solely the effect of the Maran resin. Example 14 was a control, containing no Maran resin. Examples 15 and 16 contained Maran resin and were sulfur cured while Examples 17 and 18 also contained Maran resin but were peroxide cured.

TABLE VII

| EPDM Rubber Stocks, Sulfur and Peroxide Cured | | | | | |
|---|---|---|---|---|---|
| Components | Ex. No. 14 | Ex. No. 15 | Ex. No. 16 | Ex. No. 17 | Ex. No. 18 |
| EPDM | 100 | 90 | 70 | 70 | 50 |
| Irganox 1076[a] | .5 | .5 | .5 | .5 | .5 |
| Carbon Black | 150 | 150 | 150 | 150 | 150 |
| Maran resin[b] | — | 10 | 30 | 30 | 50 |
| Zn oxide | 5 | 5 | 5 | 5 | 5 |
| Structol WB 212[c] | 5 | 5 | 5 | 5 | 5 |

TABLE VII-continued

EPDM Rubber Stocks, Sulfur and Peroxide Cured

| Components | Ex. No. 14 | Ex. No. 15 | Ex. No. 16 | Ex. No. 17 | Ex. No. 18 |
|---|---|---|---|---|---|
| Paraffin oil | 10 | 10 | 10 | 10 | 10 |
| MBT[d] | .75 | .75 | .75 | — | — |
| Accelerator[e] | 3.5 | 3.5 | 3.5 | — | — |
| Sulfur | 2 | 2 | 2 | — | — |
| HVA-2[f] | — | — | — | 2 | 2 |
| Vulcup 40 KE[g] | — | — | — | 4 | 4 |
| Total | 276.25 | 276.25 | 276.25 | 276.5 | 276.5 |

[a]Registered trademark of Ciba-Geigy Corp. for high molecular weight antioxidant
[b]Described in the specification
[c]Lubricant, fatty acid ester
[d]Mercaptobenzothiazole
[e]Tetramethyl thiuram monosulfide
[f]DuPont, bis meta-phenylene dimaleimide
[g]Vulcanizing agent, Hercules, 40% alpha,alpha' bis(t-butylperoxy)diisopropyl benzene on Burgess 40 KE clay The compositions were prepared as described for Examples No. 1–4. Physical properties excluding MAOET were determined and have been reported in Table VIII.

TABLE VIII

Physical Properties of Table VII Rubber Stocks

| | Ex. No. 14 | Ex. No. 15 | Ex. No. 16 | Ex. No. 17 | Ex. No. 18 |
|---|---|---|---|---|---|
| EPDM | 100 | 90 | 70 | 70 | 50 |
| Maran | 0 | 10 | 30 | 30 | 50 |
| Properties | | | | | |
| ML/4 100° C. | 83.6 | 79.7 | 75.5 | 80.2 | 82.0 |
| Dumbbell Tensile[a] | | | | | |
| 100% Modulus (MPa) | 2.3 | 1.8 | 3.7 | 8.0 | — |
| Tensile (MPa) | 5.1 | 6.5 | 4.4 | 8.7 | 10.5 |
| % Elongation | 540 | 370 | 260 | 120 | 35 |
| Shore "A" Hardness 23° C. | 79 | 90 | 96 | 98 | 98 |
| Compression Set 70 hrs, 100° C. | 71 | 82 | 91 | 95 | 97 |
| Ring Tear 23° C. (MPa) | 1.5 | 1.7 | 1.7 | 1.7 | 0.8 |
| Low Strain Modulus | | | | | |
| 5% (MPa) | 0.7 | 1.7 | 3.0 | 3.2 | 0.7 |
| 10% (MPa) | 1.0 | 1.9 | 3.7 | 4.9 | 7.6 |
| 20% (MPa) | 1.3 | 2.1 | 3.7 | 5.6 | 7.9 |

[a]Cured 30 minutes at 160° C.

As can be determined from the results reported in Table VIII, the tensile and physical properties other than compression set for sulfur cured and peroxide cured EPDM compositions were significantly improved by the addition of Maran.

In Table IX, four additional acrylonitrile/butadiene rubber stocks (NBR) have been reported to provide a comparison between NBR alone as a control (Ex. No. 19) and NBR with Maran (No. 20), with zinc dimethacrylate (No. 21) and with both additives (No. 22).

TABLE IX

Acrylonitrile/Butadiene Rubber Stocks, Peroxide Cured

| Components | Ex. No. 19 | Ex. No. 20 | Ex. No. 21 | Ex. No. 22 |
|---|---|---|---|---|
| Krynac 825[a] | 100 | 90 | 100 | 90 |
| Zinc dimethacrylate | — | — | 20 | 20 |
| Maran resin[b] | — | 10 | — | 10 |
| Zinc Stearate | 7 | 7 | 7 | 7 |
| Polygard[c] | 2 | 2 | 2 | 2 |
| Carbon Black | 65 | 65 | 50 | 50 |
| Vulcup 40 KE[d] | 3 | 3 | 3 | 3 |
| HVA-2 | 1.5 | 1.5 | 1.5 | 1.5 |
| Total | 178.5 | 178.5 | 183.5 | 183.5 |

[a]Acrylonitrile/butadiene rubber
[b]Described in the specification
[c]Registered trademark of Uniroyal Chemical for mixtures of alkylated aryl phosphites
[d]Vulcanizing agent, Hercules, 40% alpha,alpha' bis(t-butylperoxy)diisopropyl benzene on Burgess 40 KE clay The compositions were prepared and cured as described for Examples No. 1–4. Physical properties, including MAOET extrusion resistance were determined and have been reported in Table X.

TABLE X

Physical Properties of Table IX

| | Ex. No. 19 | Ex. No. 20 | Ex. No. 21 | Ex. No. 22 |
|---|---|---|---|---|
| NBR | 100 | 90 | 100 | 90 |
| Maran | 0 | 10 | 0 | 10 |
| Zn dimethacrylate | 0 | 0 | 20 | 20 |
| Properties | | | | |
| ML/4 100° C. | 73.4 | 72.5 | 48.8 | 47.3 |
| Stress Strain[a] | | | | |
| 20% Modulus (MPa) | 1.7 | 2.4 | 2.7 | 4.5 |
| 50% Modulus (MPa) | 3.6 | 5.2 | 5.7 | 8.9 |
| Shore "A" Hardness 23° C. | 83 | 88 | 87 | 81 |
| Compression Set 70 hrs, 100° C. | 23.8 | 31.2 | 34.4 | 38.4 |
| MAOET Visual Rating[b] | 10+ | 9 | 7 | 5 |

[a]Cured 30 minutes at 160° C.
[b]69 Mpa/30 min/149° C.

As can be determined from the results reported in Table IX, the extrusion resistance for an NBR composition was significantly improved by the substitution of a block copolymer (Maran) for a portion of the NBR. The other physical properties were also improved by the presence of one or both additives.

In Table XI, five additional NBR stocks have been reported to provide a further comparison between NBR alone as a control (Ex. No. 23) and NBR with either zinc dimethacrylate (Nos. 24, 25) or Maran (Nos. 26, 27).

TABLE XI

Acrylonitrile/Butadiene Rubber Stocks, Peroxide Cured

| Components | Ex. No. 23 | Ex. No. 24 | Ex. No. 25 | Ex. No. 26 | Ex. No. 27 |
|---|---|---|---|---|---|
| Krynac 825[a] | 100 | 90 | 80 | 100 | 90 |
| Zinc dimethacrylate | — | — | — | 20 | 20 |
| Maran resin[b] | — | 10 | 20 | — | 10 |
| Zinc Stearate | 5 | 5 | 5 | 5 | 5 |
| Polygard[c] | 1.5 | 1.5 | 1.5 | 1.5 | 1.5 |
| Carbon Black | 65 | 65 | 65 | 50 | 50 |
| Vulcup 40 KE[d] | 3.5 | 3.5 | 3.5 | 3.5 | 3.5 |
| HVA-2 | 1.5 | 1.5 | 1.5 | 1.5 | 1.5 |
| Total | 176.5 | 176.5 | 176.5 | 181.5 | 181.5 |

[a]Acrylonitrile/butadiene rubber
[b]Described in the specification
[c]Registered trademark of Uniroyal Chemical for mixtures of alkylated aryl phosphites
[d]Vulcanizing agent, Hercules, 40% alpha,alpha' bis(t-butylperoxy)diisopropyl benzene on Burgess 40 KE clay The compositions were prepared and cured as described for Examples No. 1–4. Physical properties including MAOET extrusion resistance were determined and have been reported in Table XII.

TABLE XII

| Physical Properties of Table XI Rubber Stocks | | | | | |
|---|---|---|---|---|---|
| | Ex. No. 23 | Ex. No. 24 | Ex. No. 25 | Ex. No. 26 | Ex. No. 27 |
| NBR | 100 | 90 | 80 | 100 | 90 |
| Maran | 0 | 10 | 20 | 0 | 10 |
| Zn dimethacrylate | 0 | 0 | 0 | 20 | 20 |
| Properties | | | | | |
| ML/4 100° C. | 84 | 80.6 | 76.7 | 55.5 | 59.1 |
| Stress Strain$^a$ | | | | | |
| 50% Modulus (MPa) | 5.2 | 10.7 | 14.1 | 8.5 | 11.9 |
| 100% Modulus (MPa) | 14.1 | — | — | 18.4 | — |
| Tensile (MPa) | 18.0 | 18.1 | 13.6 | 17.1 | 15.9 |
| % Elongation | 72.2 | 80.3 | 49.9 | 100 | 74.9 |
| Shore "A" Hardness 23° C. | 80 | 88 | 90 | 85 | 87 |
| Compression Set 70 hrs, 100° C. | 17.6 | 17.3 | 22.3 | 28.0 | 28.0 |
| MAOET Visual Rating$^b$ | 8 | 6 | 5 | 7 | 7 |

$^a$Cured 30 minutes at 160° C.
$^b$69 MPa/30 min/149° C.

Presence of zinc dimethacrylate was not as effective as the Maran. As can be determined from the results reported in Table XII, the extrusion resistance for an NBR composition was improved by the substitution of a block copolymer (Maran) for a portion of the NBR. The other physical properties were also improved somewhat by the presence of either additive.

In Table XIII, four more NBR rubber compositions have been reported, none of which contained any zinc dimethacrylate, so as to demonstrate the effect of the Maran resin. Also, each of the examples were sulfur cured, rather than peroxide cured.

TABLE XIII

| Acrylonitrile/Butadiene Rubber Stocks, Sulfur Cured | | | | |
|---|---|---|---|---|
| Components | Ex. No. 28 | Ex. No. 29 | Ex. No. 30 | Ex. No. 31 |
| Krynac 825$^a$ | 100 | 90 | 80 | 70 |
| Maran resin$^b$ | — | 10 | 20 | 30 |
| Carbon black | 50 | 50 | 50 | 50 |
| Cabosil$^c$ | 15 | 15 | 15 | 15 |
| Silane$^d$ | 2 | 2 | 2 | 2 |
| Stearic acid | 2 | 2 | 2 | 2 |
| Wax | 2 | 2 | 2 | 2 |
| ZnO | 5 | 5 | 5 | 5 |
| Structol$^e$ A60 | 3 | 3 | 3 | 3 |
| Santoflex 13$^f$ | 2.5 | 2.5 | 2.5 | 2.5 |
| DOP$^g$ | 8 | 8 | 8 | 8 |
| Carbowax 4000$^h$ | 1.5 | 1.5 | 1.5 | 1.5 |
| Sulfur | 1.5 | 1.5 | 1.5 | 1.5 |
| Accelerator$^i$ | 1.5 | 1.5 | 1.5 | 1.5 |
| Total | 194 | 194 | 194 | 194 |

$^a$Acrylonitrile/butadiene rubber
$^b$Described in the specification
$^c$Colloidal silica
$^d$Coupling agent, bis[3-triethoxy silylpropyl]tetrasulfide
$^e$Lubricant, zinc salt of fatty acids
$^f$Trademark of Monsanto Industrial Chemicals Co. for rubber antioxidants and antiozonants
$^g$Dioctyl phthalate
$^h$Polyethylene glycols and methoxypolyethylene glycols
$^i$Tetramethyl thiuram monosulfide The compositions were prepared as described for Examples No. 1–4. Physical properties excluding MAOET were determined and have been reported in Table XIV.

TABLE XIV

| Physical Properties of Table XIII Rubber Stocks | | | | |
|---|---|---|---|---|
| | Ex. No. 28 | Ex. No. 29 | Ex. No. 30 | Ex. No. 31 |
| NBR | 100 | 90 | 80 | 70 |
| Maran | 0 | 10 | 20 | 30 |
| Properties | | | | |
| ML/4 100° C. | 66.5 | 72.0 | 74.8 | 92.7 |
| Stress Strain$^a$ | | | | |
| 50% Modulus (MPa) | 2.7 | 3.6 | 4.3 | 5.2 |
| 100% Modulus (MPa) | 4.9 | 6.7 | 8.4 | 10.7 |
| Tensile (MPa) | 16.6 | 13.4 | 11.6 | 10.9 |
| % Elongation | 242 | 167 | 134 | 103 |
| Shore "A" Hardness 23° C. | 78 | 83 | 86 | 90 |
| Compression Set 70 hrs, 100° C. | 32.0 | 34.4 | 32.6 | 38.4 |
| Ring Tear 23° C. (MPa) | 2.7 | 1.9 | 1.8 | 1.3 |
| Low Strain Modulus | | | | |
| 5% (MPa) | 0.8 | 1.0 | 1.1 | 1.2 |
| 10% (MPa) | 1.1 | 1.4 | 1.5 | 1.8 |
| 20% (MPa) | 1.6 | 2.0 | 2.1 | 2.7 |

$^a$Cured 30 minutes at 160° C.

As can be determined from the results reported in Table XIV, the modulus and other physical properties for sulfur cured NBR compositions were significantly improved by the addition of Maran.

Based upon the results reported herein, it should be apparent that the method of the present invention can be employed to provide improved physical properties to a variety of elastomers. Similarly novel elastomer compositions comprising blends of elastomers with block copolymers containing elastomeric blocks and crystalline blocks or with metal dimethacrylates, or both, have been shown to have improved extrusion resistance.

In addition to utility as well packers, the elastomer compositions of the present invention can be utilized in other embodiments where extrusion resistance is of benefit such as in the manufacture of draft gear pads. Draft gear pads are a type of cushion for heavy equipment which interpose a disc-shaped rubber element between steel plates, stacked in a column. Force exerted on the column drives the plates against each other with compression of the discs. In such environments, the rubber is substantially flattened and must have exceptional extrusion resistance in order to recover without failure.

Although practice of the invention has been demonstrated with EPDM and NBR it should be appreciated that the improved physical properties reported can be obtained with other rubbers. Thus, it is to be understood that the examples reported herein have been provided to present results obtainable by practice of the disclosed invention. Inasmuch as various elastomers as well as block copolymers and metal dimethacrylates have been disclosed for practice of the present invention, the invention is not to be limited by the examples provided herein. It will be understood, therefore, that other elastomers, block copolymers and metal dimethacrylates can be substituted for those that have been exemplified. Regarding the selection of fillers, curatives and other additives and the like, the present invention should not be restricted thereby inasmuch as they are usually conventionally employed and do not constitute the point of novelty.

It is also to be understood that the amounts of particular block copolymers and optional metal dimethacrylates to be employed as well as various process conditions can be determined without departing from the spirit of the invention herein disclosed and described, and that the scope of the invention shall include all modifications and variations that fall within the scope of the attached claims.

We claim:

1. A curable elastomer composition having improved extrusion resistance comprising a homogeneous blend of:

from about 50 to about 90 parts by weight of a rubber having a weight average molecular weight of from about 50,000 to about 500,000 and selected from the group consisting of natural rubber, polyisoprene, styrene butadiene, polybutadiene, butyl rubber, Neoprene, ethylene/propylene rubber, ethylene/propylene/diene rubber, acrylonitrile/butadiene rubber, silicone rubber, fluoroelastomers, ethylene acrylic rubber, ethylene vinyl acetate copolymer, epichlorohydrin rubbers, chlorinated polyethylene rubbers, chlorosulfonated polyethylene rubbers, hydrogenated nitrile rubber and tetrafluoroethylene/propylene rubber and blends thereof and from about 10 to about 50 parts by weight of a block copolymer containing elastomeric blocks comprising an anionically polymerizable rubber-forming monomer, and crystalline or semi-crystalline blocks comprising a thermosetting plastic to form 100 total parts of elastomer;

wherein said elastomeric blocks of said block copolymers are prepared from monomers selected from the group consisting of olefin, conjugated diene, vinyl substituted aromatic, vinyl substituted pyridine, vinyl substituted quinoline;

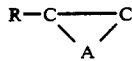

where A is O or S and R is H or an aliphatic, cycloaliphatic or aromatic group containing from 1 to 15 carbon atoms inclusive;

where A is O or S and R is an aliphatic, cycloaliphatic or aromatic group containing from 1 to 15 carbon atoms inclusive;

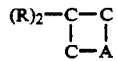

where A is O or S and R is an aliphatic, cycloaliphatic or aromatic group containing from 1 to 15 carbon atoms inclusive; and

where R is aliphatic, cycloaliphatic or aromatic group containing from 1 to 15 carbon atoms inclusive;

said crystalline blocks are selected from the group consisting of monomers having an active hydrogen other than monomers employed to form said elastomeric block; and said monomers having an active hydrogen are selected from the group consisting of lactams, ureas, urethanes, urethane-urea copolymers, imides, thioureas and thiourethanes.

2. A curable elastomer composition, as set forth in claim 1, wherein said block copolymer comprises 1,2-polybutadiene and nylon.

3. A curable elastomer composition, as set forth in claim 2, wherein said rubber is ethylene/propylene/diene rubber.

4. A curable elastomer composition, as set forth in claim 3, further comprising
up to about 50 parts by weight per 100 parts of said elastomer of a metal dimethacrylate selected from the group consisting of zinc dimethacrylate and magnesium dimethacrylate.

5. A curable elastomer composition, as set forth in claim 2, wherein said rubber is acrylonitrile/butadiene rubber.

6. A curable elastomer composition, as set forth in claim 5, further comprising
up to about 50 parts by weight per 100 parts of said elastomer of a metal dimethacrylate selected from the group consisting of zinc dimethacrylate and magnesium dimethacrylate.

7. A curable elastomer composition, as set forth in claim 1, further comprising
up to about 50 parts by weight per 100 parts of said elastomer of a metal dimethacrylate selected from the group consisting of zinc dimethacrylate and magnesium dimethacrylate.

8. A method for improving the extrusion resistance of curable elastomer compositions comprising the steps of:

blending together from about 50 to about 90 parts by weight of a rubber having a weight average molecular weight of from about 50,000 to about 500,000 and selected from the group consisting of natural rubber polyisoprene, styrene butadiene, polybutadiene, butyl rubber, Neoprene, ethylene/propylene rubber, ethylene/propylene/diene rubber, acrylonitrile/butadiene rubber, silicone rubber, fluoroelastomers, ethylene acrylic rubber, ethylene vinyl acetate copolymer, epichlorohydrin rubbers, chlorinated polyethylene rubbers, chlorosulfonated polyethylene rubbers, hydrogenated nitrile rubber and tetrafluoroethylene/propylene rubber and blends thereof with from about 10 to about 50 parts by weight of a block copolymer containing elastomeric blocks comprising an anionically polymerizable rubber-forming monomer, and crystalline or semi-crystalline blocks comprising a thermosetting plastic to form a mixture of 100 total parts; and curing said mixture under conditions suitable for said rubber;

wherein said elastomeric blocks of said block copolymers are prepared from monomers selected from the group consisting of olefin, conjugated diene, vinyl substituted aromatic, vinyl substituted pyridine, vinyl substituted quinoline:

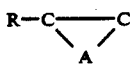

where A is O or S and R is H or an aliphatic, cycloaliphatic or aromatic group containing from 1 to 15 carbons atoms inclusive;

where A is O or S and R is an aliphatic, cycloaliphatic or aromatic group containing from 1 to 15 carbon atoms inclusive;

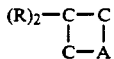

where A is O or S and R is an aliphatic, cycloaliphatic or aromatic group containing from 1 to 15 carbons atoms inclusive; and

where R is an aliphatic, cycloaliphatic or aromatic group containing from 1 to 15 carbon atoms inclusive;
said crystalline blocks are selected from the group consisting of monomers having an active hydrogen other than monomers employed to from said elastomeric block; and
said monomers having an active hydrogen are selected from the group consisting of lactams, ureas, urethanes, urethane-urea copolymers, imides, thioureas and thiourethanes.

9. A method, as set forth in claim 8, wherein said block copolymer comprises 1,2-polybutadiene and nylon.

10. A method, as set forth in claim 9, wherein said rubber is ethylene/propylene/diene rubber.

11. A method, as set forth in claim 10, including the further step of
adding to said mixture up to about 50 parts by weight per 100 parts of said elastomer of a metal dimethacrylate selected from the group consisting of zinc dimethacrylate and magnesium dimethacrylate.

12. A method, as set forth in claim 9, wherein said rubber is acrylonitrile/butadiene rubber.

13. A method, as set forth in claim 12, including the further step of
adding to said mixture up to about 50 parts by weight per 100 parts of said elastomer of a metal dimethacrylate selected from the group consisting of zinc dimethacrylate and magnesium dimethacrylate.

14. A method, as set forth in claim 8, including the further step of
adding to said mixture up to about 50 parts by weight per 100 parts of said elastomer of a metal dimethacrylate selected from the group consisting of zinc dimethacrylate and magnesium dimethacrylate.

15. A method, as set forth in claim 8, wherein said step of curing is conducted at 140° to 175° C. for a period of time of about 0.1 to 8 hours.

* * * * *